(12) United States Patent
Doucet et al.

(10) Patent No.: US 7,627,006 B2
(45) Date of Patent: Dec. 1, 2009

(54) MULTI-WAVELENGTH LASER SOURCE

(75) Inventors: Serge Doucet, Val-Bélair (CA); Sophie Larochelle, Cap-Rouge (CA); Radan Slavik, Zábĕhlice (CZ); Isabelle Castonguay, Rouyn-Noranda (CA)

(73) Assignee: Universite Laval, Quebec (CA)

( * ) Notice: Subject to any disclaimer, the term of this patent is extended or adjusted under 35 U.S.C. 154(b) by 192 days.

(21) Appl. No.: 10/665,138

(22) Filed: Sep. 18, 2003

(65) Prior Publication Data

US 2005/0063430 A1    Mar. 24, 2005

(51) Int. Cl.
*H01S 3/30* (2006.01)
*H01S 3/10* (2006.01)

(52) U.S. Cl. ............................... 372/6; 372/23; 372/102

(58) Field of Classification Search .................... 372/6, 372/23, 102
See application file for complete search history.

(56) References Cited

U.S. PATENT DOCUMENTS

| | | | |
|---|---|---|---|
| 5,323,404 A * | 6/1994 | Grubb | 372/6 |
| 5,600,665 A | 2/1997 | Minden et al. | |
| 5,844,927 A * | 12/1998 | Kringlebotn | 372/6 |
| 5,910,962 A * | 6/1999 | Pan et al. | 372/6 |
| 6,163,553 A | 12/2000 | Pfeiffer | |
| 6,295,304 B1 | 9/2001 | Koch et al. | |
| 6,407,855 B1 * | 6/2002 | MacCormack et al. | 359/346 |
| 6,463,083 B1 | 10/2002 | Sumiyoshi et al. | |
| 6,621,960 B2 * | 9/2003 | Wang et al. | 385/37 |
| 2002/0080832 A1 | 6/2002 | Chang et al. | |
| 2002/0154661 A1 | 10/2002 | Hoose et al. | |
| 2004/0037505 A1 * | 2/2004 | Morin | 385/37 |

FOREIGN PATENT DOCUMENTS

CA    2359884    10/2001

OTHER PUBLICATIONS http://www.photonics.com/content/spectra/2006/January/research/77598.aspx Photonics Research news letter, Jan. 2006.*
Town et al. "Dual wavelength mode-locked fiber laser", IEEE photonics technology letters vol. 12 No. 11 Nov. 2000.*
L. Dong, L., W. H. Loh, J. E. Caplen, J. D. Minelly, K. Hsu and L. Reekie "Efficient single-frequency fiber lasers with novel photosensitive Er/Yb optical fibers", Opt. Lett. 22, pp. 694-696 (1997).
G. A. Ball and W. H. Glenn, "Design of a single-mode linear-cavity erbium fiber laser utilizing Bragg reflectors", J. Lightwave Technol. 10, pp. 1338-1343 (1992).

(Continued)

*Primary Examiner*—Minsun Harvey
*Assistant Examiner*—Marcia A. Golub
(74) *Attorney, Agent, or Firm*—Ladas & Parry LLP

(57) ABSTRACT

A multi-wavelength laser source is provided including a pump laser unit, a gain section and an output. The pump laser unit generates an energy signal, which is applied to the gain section. The gain section includes a gain medium with having a superstructure grating forming a distributed Fabry-Perot-like structure. The superstructure grating causes a multi-wavelength laser signal to be generated when the energy signal is applied to the gain medium. The multi-wavelength laser signal is then released at the output.

55 Claims, 13 Drawing Sheets

OTHER PUBLICATIONS

G. A. Ball, W. H. Glenn, W. W. Morey, and P. K. Cheo, "Modeling of short, single-frequency, fiber lasers in high-gain fiber", IEEE Photon. Technol. Lett. 5, pp. 649-651 (1993).

J. L. Zyskind, V. Mizrahi D. J. DiGiovanni and J. W. Sulhoff, "Short single frequency erbium-doped fibre laser", Electron. Lett. 28, pp. 1385-1387 (1992).

G.A. Ball and W. W. Morey, "Compression-tuned single-frequency Bragg grating fiber laser", Opt. Lett. 19, pp. 1979-1981 (1994).

J. T. Kringlebotn, J.-L. Archambault, L. Reekie, and D. N. Payne, "Er3+:Yb3+-codoped fiber distributed-feedback laser", Opt. Lett. 19, pp. 2101-2103, (1994).

M. Sejka, P. Varming, J. Hübner and M. Kirstensen, "Distributed feedback Er3+-doped fibre laser", Electron. Lett. 31, pp. 1445-1446 (1995).

W. H. Loh, and R. I. Laming, "1.55 mm phase-shifted distributed feedback fibre laser", Electron. Lett. 31, pp. 1440-1442 (1995).

W. H. Loh, B. N. Samson, L. Dong, G. J. Cowle, and K. Hsu, "High performance single frequency fiber grating-based erbium: Ytterbium-codoped fiber lasers", J. Lightwave Technol. 16, pp. 114-118 (1998).

E. Ronnekleiv, M. N. Zervas, and J. T. Kringlebotn, "Modeling of Plarization-Mode Competition in Fiber DFB Lasers", IEEE J. Quantum Electron. 34, pp. 1559-1569 (1998).

Z. E. Harutjunian, W. H. Loh, R. I. Laming, and D. N. Payne, "Single polarisation twisted distributed feedback fibre laser", Electron. Lett. 32, pp. 346-348 (1996).

H. Y. Kim, S. K. Kim, H. J. Jeong, H. K. Kim, B. Y. Kim, "Polarization properties of a twisted fiber laser", Opt. Lett. 20, pp. 386-388 (1995).

H. Storoy, B. Sahlgren, and R. Strubbe, "Single polarisation fibre DFB laser", Electron. Lett. 33, pp. 56-58 (1997).

M. Ibsen, E. Ronnekleiv, G. J. Cowle, M. O. Berendt, O. Hadeler, M. N. Zervas, and R. I. Laming, "Robust high power (>20mW) all-fibre DFB lasers with unidirectional and truly single polarisation outputs", Technical Digest of the Conference on Lasers and Electro-Optics (CLEO), paper CW4, pp. 245-246 (1999).

S. Yamashita, K. Hsu, W. H. Loh, "Miniature Erbium:Ytterbium Fiber Fabry-Perot Multiwavelength Lasers", IEEE J. of Selected Topics in Quantum Electronics 3, pp. 1058-1064 (1997).

S. V. Chernikov, J. R. Taylor and R. Kashyap, "Coupled-cavity erbium fiber lasers inforporating fiber grating reflectors", Opt. Lett. 18, pp. 2023-2025 (1993).

J. Hübner, P. Varming and M. Kristensen, "Five wavelength DFB fibre laser source for WDM systems", Electron. Lett. 33, pp. 139-140 (1997).

M. Ibsen S-u. Alam., M. N. Zervas, A. B. Grudinin, and David N. Payne, "8- and 16- Channel All-Fiber Laser WDM Transmitters with Integrated Pump Redundancy", IEEE Photon. Technol. Lett. 11, pp. 1114-1116 (1999).

R. Slavk, S. Doucet and S. LaRochelle, "High-performance All-fiver Fabry-Perot Filters with Superimposed Chirped Bragg Gratings", J. of Lightwave Technol. 21, pp. 1059-1065 (2003).

G. E. Town, K. Sugden, J. A. R. Williams, I. Bennion, and S. B. Poole, "Wide-band Fabry-Perot-like filters in optical fiber", IEEE Photon. Technol. Lett. 7, pp. 78-80 (1995).

M. Ibsen, E. Ronnekleiv, G. J. Cowle, M. N. Zervas and R. I. Laming, "Multiple wavelength all-fibre DFB lasers", Electron. Lett. 36, pp. 143-144 (2000).

* cited by examiner

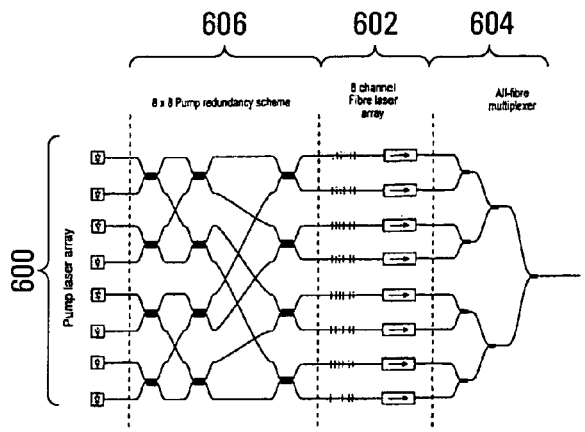
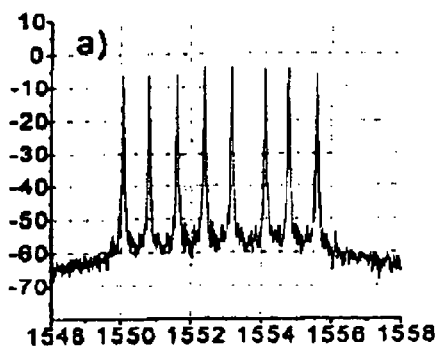
FIG. 6A
(Prior Art)
FIG. 6B
(Prior Art)
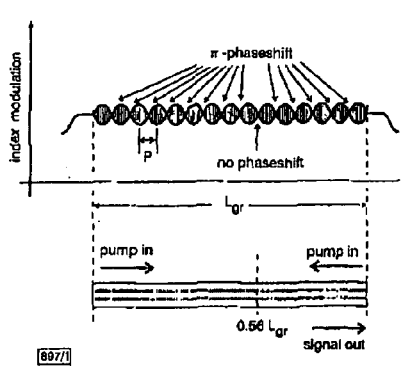
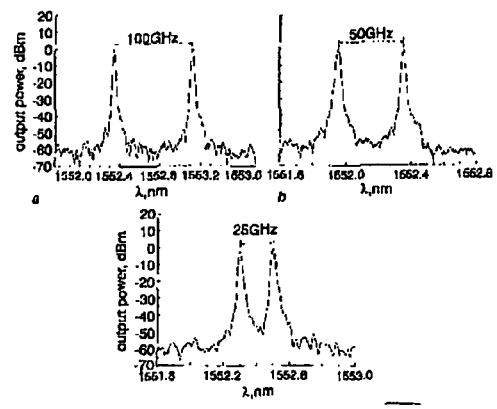
FIG. 7A
(Prior Art)
FIG. 7B
(Prior Art)

MULTI-WAVELENGTH LASER SOURCE

FIELD OF THE INVENTION

The present invention relates generally to lasers and, more particularly, to a multi-wavelength laser source. This invention is particularly application in the fields of telecommunications, optics, sensing and spectroscopy.

BACKGROUND OF THE INVENTION

Compared to other compact laser sources, fiber lasers present superior performance in terms of spectral purity and noise. Furthermore, their output is readily compatible with fiber optics systems and components by fusion splicing and standard connectors. Nowadays fiber lasers with high spectral purity are typically realized using photo-induced fiber Bragg gratings.

In recent years, optical fiber lasers have been developed to cover a wide range of spectral bands. The gain medium of these lasers is typically composed of silica, fluoride or chalcogenide host matrix doped with rare earth ions. Of particular interest is erbium-doped silica which produces gain in the 1530 to 1610 nm wavelength band. This spectral region, also known as the third communication window, corresponds to the minimum loss of silica optical fiber.

Fiber lasers can operate either in continuous wave (CW) or pulsed (Q-switched or mode-locked) emission regimes. In the latter regime, the advantages of fiber lasers are its high peak powers, energies and repetition rates. In the former regime, fiber lasers are attractive because of their narrow linewidth and spectral tunability. In both cases, other advantages include the compactness of the laser source and the compatibility of the laser output to optical fiber transmission link and components by direct fusion splicing. A review of fiber laser technology can be found in M. J. F. Digonnet, editor, *Rare-Earth-Doped Fiber Lasers and Amplifiers*, Marcel Dekker, 2001. The content of the above document is incorporated herein by reference.

Narrow line-width single-mode fiber lasers operating in CW regime can be made using several configurations. In free running mode, the emission wavelength corresponds to the wavelength having the highest gain. To tune the emission wavelength, a narrow-bandwidth filter can be incorporated in the cavity. Initially, fiber lasers had long cavities that resulted in a highly multimode spectrum at the emitting wavelength. To obtain single-mode emission, complex configurations involving either coupled cavities or a cascade of narrow filters had to be used. In all cases, the lasers required extensive stabilization systems. Recent progress in the development of fiber Bragg gratings has allowed the realization of short fiber lasers with single-mode output. These lasers are easier to stabilize than the previous configurations. Furthermore, the emission wavelength can be varied by temperature or strain tuning of the fiber gratings.

In many applications, it is required to have a laser source emitting on several wavelengths or frequencies. In telecom applications, these frequencies are usually spaced by fixed intervals like 50 GHz, 100 GHz or 200 GHz. At each of these frequencies, the emission spectrum has to be very pure. Fiber lasers are usually not considered to be good candidates for multi-frequency laser sources because the gain competition between the lasing frequencies results in an unstable output that allows emission over only a few closely spaced wavelengths. This effect is intrinsic to rare-earth doped silica materials which typically behaves like homogenously broadened gain medium at room temperature.

Fabry-Perot laser cavities are realized by placing a gain medium between two mirrors. These cavities are characterized by resonance frequencies, known as longitudinal modes, spaced by:

$$\Delta f = c/2nL \tag{1}$$

where $\Delta f$ is the frequency separation between two modes, n the refractive index of the medium, L the length of the cavity, i.e the distance between the reflectors, and c the speed of light. Long cavities will therefore have closely spaced modes. To reduce the number of lasing modes, it is necessary to introduce some differentiation in the net gain, i.e. spectral gain of the medium minus the spectral cavity loss, experienced by the longitudinal modes. Similarly to semiconductor technology this mode selection is accomplished with a narrow band reflector made by a distributed index modulation. For additional information, the reader is invited to refer to G. Mothier, P. Vankwikelberge, *Handbook of distributed feedback laser diodes*, Artech House, 1997 and H. Kogelnik and C. V. Shank, "Coupled-Wave Theory of Distributed Feedback Lasers", J. of Appl. Physics 43, pp. 2327-2335 (1972). The content of the above documents is incorporated herein by reference. These are known as Bragg gratings. A modulation of the refractive index with a period $\Lambda$ creates a narrow-band reflector centered on the Bragg wavelength defined by:

$$\lambda_B = 2n_{\text{eff}}\Lambda \tag{2}$$

where $n_{\text{eff}}$ is the effective index of the reflected waveguide mode. The maximum reflection and the bandwidth of the distributed mirror are related to the amplitude of the index modulation as well as to the length of the grating. For example, a review of fiber Bragg grating technology that can be photoinduced in optical fibers or glass waveguides by exposure to UV light can be found in R. Kashyap, *Fiber Bragg Gratings*, Academic Press, 1999. The content of the above document is incorporated herein by reference.

Two types of narrow linewidth laser configurations are typically used. The first one is the DBR laser (Distributed Bragg Reflector) and the second one is the DFB laser (Distributed Feedback). In the first type, represented in FIG. 1, the short gain section is sandwiched between two narrow-bandwidth reflectors. The effective length of the cavity corresponds to the spacing between the gratings plus a penetration depth that takes into account the dispersion and time response of the distributed reflectors. The longitudinal mode spacing of the cavity is such that only one mode will resonate with sufficient gain and therefore singlemode output is obtained. In the second type, represented in FIG. 2, a $\rho$ phase shift is introduced in the grating structure. The structure then presents only one resonating mode with a frequency corresponding to the Bragg wavelength.

DFB or DBR fiber lasers also make use of several external components. With reference to FIGS. 3a and 3b, the doped optical fiber 300 with the laser structure is typically fusion spliced to a wavelength selective coupler (WDM coupler) 302 on one end, to allow the injection of the pump laser 304 light, and to an isolator 306 on the other end, to avoid instabilities caused by reflections. For erbium-doped glasses, the pump 304 is more often a 980 nm laser diode but sometimes also a 1480 nm laser diode will be used. The injection of the pump 304 can be performed either in a co-propagation configuration or a counter-propagation configuration. FIG. 3a shows the different components of a co-propagation pumping configuration and FIG. 3b shows the different components of a counter-propagation pumping configuration.

Most work on fiber laser has been done using silica optical fibers doped with $Er^{3+}$ to obtain an output wavelength in the 1530 to 1560 nm spectral range. Because of the short length of the gain section, the fiber is often co-doped with $Yb^{3+}$ ion to increase the pump absorption. In all cases, high-doping concentration of $Er^{3+}$ and $Yb^{3+}$ is typically used to provide sufficient absorption and gain. At the same time, the photosensitive response of the optical fiber must be sufficient to allow the writing of the refractive index grating acting as the reflectors. The photosensitivity of optical fiber is most often related to the presence of the germania dopant used to increase the refractive index of the fiber core. Unfortunately, high levels of germania dopants leads to clustering of the rare earth ions and reduces the emission properties of fiber lasers. In 1997, researchers at Southampton University introduced a new design of optical fiber in which the rare earth ions are introduced in the core of the optical fiber while germania and boron are present in an annular region of the cladding. This is described in L. Dong, L., W. H. Loh, J. E. Caplen, J. D. Minelly, K. Hsu and L. Reekie "Efficient single-frequency fiber lasers with novel photosensitive Er/Yb optical fibers", Opt. Lett. 22, pp. 694-696 (1997). The contents of this document are incorporated herein by reference. This fiber design, separating the active and the photosensitive regions, has allowed higher output power to be obtained for both DBR and DFB configurations. Another way to increase the photosensitivity of optical fiber is to use hydrogen loading techniques such as those described in P. Lemaire, R. M. Atkins, V. Mizrahi, W. Reed, "High pressure $H_2$ loading as a technique for achieving ultrahigh UV photosensitivity and thermal sensitivity in $GeO_2$ doped optical fibres." Electron. Lett. 29, pp. 1191-1193 (1993). The contents of this document are incorporated herein by reference. In such techniques the fiber is placed under high pressure of hydrogen to make the hydrogen molecules diffuse in the glass. Upon 10 exposure to UV radiation, the photosensitive response is greatly enhanced but optical losses of typically 0.1 dB/cm will also be induced around 1550 nm as shown in D. Johlen, F. Knappe, H. Renner, and E. Brinkmeyer, "UV-induced Absorption, Scattering and Transition Losses in UV Side-Written Fibers", OFC paper ThD1-1, p.50-52 (1991). The loss is due to an overtone of a vibration mode of the OH group that is being formed in the fiber. This loss is very detrimental to the performance of short single-mode fiber lasers. A possible solution is to replace the hydrogen by deuterium for which the vibration mode is located at higher wavelengths as described in J. Stone, "Interactions of Hydrogen and Deuterium with Silica Optical Fibers: A Review", J. of Ligthwave Technol. LT-5, pp.712-732 (1987). The contents of the above document are incorporated herein by reference.

The first single-frequency single-mode fiber lasers were DBR lasers with 1-2 cm cavity length described in:

G. A. Ball and W. H. Glenn, "Design of a single-mode linear-cavity erbium fiber laser utilizing Bragg reflectors", J. Lightwave Technol. 10, pp. 1338-1343 (1992).

G. A. Ball, W. H. Glenn, W. W. Morey, and P. K. Cheo, "Modeling of short, single-frequency, fiber lasers in high-gain fiber", IEEE Photon. Technol. Lett. 5, pp. 649-651 (1993).

J. L. Zyskind, V. Mizrahi, D. J. DiGiovanni and J. W. Sulhoff, "Short single frequency erbium-doped fibre laser", Electron. Lett. 28, pp. 1385-1387 (1992).

The contents of the above documents are incorporated herein by reference. The gratings were photo-induced in an $Er^{3+}$ doped silica optical fiber and presented output power of typically 50-100 µW. In later work, an amplification section was added after the single-mode laser to reach higher output power, typically 3-10 mW as described in G. A. Ball and W. W. Morey, "Compression-tuned single-frequency Bragg grating fiber laser", Opt. Lett. 19, pp. 1979-1981 (1994) and J. -M. Delavaux, Y. -K. Park, V. Mizrahi, and D. J. DiGiovanni, "Long-term bit error rate transmission using an erbium fiber grating laser transmitter at 5 and 2.5 Gb/s", Opt. Fiber Technol. 1, pp. 72-75 (1994). The contents of the above documents are incorporated herein by reference.

Ball et al. also demonstrated wavelength tuning over 32 nm by compression of the fiber laser along its axis. Such a DBR fiber laser was used as the optical source for a transmission experiment at 5 and 2.5 Gbit/s. The efficiency of DBR lasers was later improved to 25% using an $Er^{3+}/Yb^{3+}$ co-doped fiber with photosensitive cladding and output power in excess of 15 mW was obtained without amplification.

DFB fiber lasers were first realized by writing uniform fiber Bragg gratings over an $Er^{3+}$ doped silica optical fiber. The phase-shift was subsequently induced either temporarily by heating the fiber or permanently by performing a second UV exposure of a small section of the grating. Such DFB fiber lasers are described in J. T. Kringlebotn, J. -L. Archambault, L. Reekie, and D. N. Payne, "$Er^{3+}:Yb^{3+}$-codoped fiber distributed-feedback laser", Opt. Lett. 19, pp. 2101-2103, (1994) and M. Sejka, P. Varming, J. Hübner and M. Kirstensen, "Distributed feedback $Er^{3+}$-doped fibre laser", Electron. Lett. 31, pp. 1445-1446 (1995). The contents of the above documents are incorporated herein by reference.

In later work, the phase-shifted grating was written in a single step as described in W. H. Loh, and R. I. Laming, "1.55 µm phase-shifted distributed feedback fibre laser", Electron. Lett. 31, pp. 1440-1442 (1995). Typical output powers of the devices are 1-3 mW in usual photosensitive $Er^{3+}/Yb^{3+}$ co-doped fibers to 10-20 mW in $Er^{3+}/Yb^{3+}$ co-doped fibers with photosensitive cladding.

Although most devices are found to operate on a single longitudinal mode, two polarization modes separated by a few GHz are often observed. The splitting of the polarization modes is caused by intrinsic or photoinduced birefringence in the optical fiber cavity. Truly singlemode behavior requires the suppression of one of the polarization modes. Single polarization emission is usually obtained by increasing the birefringence of the optical fiber either through UV exposure or by applying external strain to the fiber like transverse strain or twist. Both these methods have been used to obtain single frequency fiber laser. For additional information, the reader is invited to refer to the following documents:

E. Ronnekleiv, M. N. Zervas, and J. T. Kringlebotn, "Modeling of Polarization-Mode Competition in Fiber DFB Lasers", IEEE J. Quantum Electron. 34, pp. 1559-1569 (1998).

Z. E. Harutjunian, W. H. Loh, R. I. Laming, and D. N. Payne, "Single polarisation twisted distributed feedback fibre laser", Electron. Lett. 32, pp. 346-348 (1996).

H. Y. Kim, S. K. Kim, H. J. Jeong, H. K. Kim, B. Y. Kim, "Polarizarion properties of a twisted fiber laser", Opt. Lett. 20, pp.386-389 (1995).

H. Storoy, B. Sahlgren, and R. Stubbe, "Single polarisation fibre DFB laser", Electron. Lett. 33, pp. 56-58 (1997).

M. Ibsen, E. Ronnekleiv, G. J. Cowle, M. O. Berendt, O. Hadeler, M. N. Zervas, and R. I. Laming, "Robust high power (>20 mW) all-fibre DFB lasers with unidirectional and truly single polarisation outputs", Technical Digest of the Conference on Lasers and Electro-Optics (CLEO), paper CW4, pp.245-246 (1999).

The contents of the above documents are incorporated herein by reference.

Multi-frequency operation of fiber lasers on well-separated wavelengths is usually prevented by cross gain saturation. Generally speaking, erbium-doped silica behaves at room temperature as a homogenously broadened gain medium. Therefore, simultaneous emission can usually be observed over a few, typically two or three, closely spaced wavelengths provided that the spectral gain is very flat. Emission over a larger number of wavelengths can be achieved by cooling the fiber to a cryogenic temperature, a rather unpractical approach. Another solution is to spatially separate the sections of the gain medium with which the different wavelengths interact. In the following paragraphs, we present in details some of these solutions.

The first approach is based on a miniature FP (Fabry-Perot) laser with a cavity composed of a short segment of doped fiber 400, 1 or 2 mm, placed between external reflectors 402 404 as shown in FIG. 4a. The longitudinal mode spacing of this laser, $\Delta f$ of 100 GHz or 50 GHz, corresponds to the desired frequency comb. By immersing the laser in liquid nitrogen multi-frequency emission is obtained over 17 wavelengths as depicted in FIG. 4b. However, as the temperature is increased, gaps appear in the optical spectrum and the power becomes unstable as depicted in FIGS. 4c and 4d. In all cases the output power is very low, typically of the order of 100 μW for all the wavelengths combined.

In another approach, depicted in FIG. 5a, individual DFB or DBR fiber 500-508 are placed in series along an optical fiber and pumped with a common pump source 510. This configuration is described in S. V. Chernikov, J. R. Taylor and R. Kashyap, "Coupled-cavity erbium fiber lasers incorporating fiber grating reflectors", Opt. Lett. 18, pp. 2023-2025 (1993) and J. Hübner, P. Varming and M. Kristensen, "Five wavelength DFB fibre laser source for WDM systems", Electron. Lett. 33, pp. 139-140 (1997). The contents of the above documents are incorporated herein by reference. Hübner et al. have thus realized a five-wavelengths laser source having an output spectrum of the type shown in FIG. 5b. Each fiber laser being 5 cm long, the resulting structure is therefore quite long and difficult to stabilize.

Another approach, depicted in FIG. 6a, is to multiplex a plurality of individual DFB lasers 600 using wavelength selective couplers or combiners. The implementation presented in FIG. 6 also includes pump combiners 606 to provide protection against the failure of a laser pump. Although the available output power obtained from each laser is high, approximately 3 mW, the number of pump laser diodes increases the cost and complexity. FIG. 6b shows the output spectrum (optical power in dBm vs wavelength in nm) of the configuration of FIG. 6a.

A last approach is to realize multiple DFB lasers on the same fiber segment for example by writing two gratings with slightly different period. This grating structure, also known as a Moire grating, is represented in FIG. 7a. FIG. 7b shows the output spectrum for several dual-frequency laser samples with different frequency spacing. A specific implementation of this technique was described in M. Ibsen, E. Ronnekleiv, G. J. Cowle, M. O. Berendt, O. Hadeler, M. N. Zervas, and R. I. Laming, "Robust high power (>20 mW) all-fibre DFB lasers with unidirectional and truly single polarisation outputs", Technical Digest of the Conference on Lasers and Electro-Optics (CLEO), paper CW4, pp.245-246 (1999). The content of the above document is incorporated herein by reference. In this document, the grating structure was written in a single step and one of the phase shifts was omitted to create the laser cavity. Emission over two wavelengths was obtained. This dual wavelength emission was attributed to spatial hole burning in the laser cavity. This approach is however limited in terms of the number of wavelengths that could be achieved since all the laser cavities are located at the same position on the optical fiber.

In the context of the above, there is a need in the industry to provide a multi-wavelength laser source that alleviates at least in part problems associated with the existing methods and devices.

SUMMARY OF THE INVENTION

In accordance with a first broad aspect, the invention provides a multi-wavelength laser source comprising an input for receiving an energy signal, a gain section and an output. The gain section includes a gain medium having a superstructure grating forming a distributed Fabry-Perot-like structure. The gain section is in communication with the input. The gain section generates a multi-wavelength laser signal when the energy signal is applied to the gain section. The multi-wavelength laser signal is emitted at the output.

In another specific implementation, the superstructure grating includes an apodized grating structure. In a non-limiting implementation, the apodized grating structure includes a variation of the amplitude and phase of the refractive index modulation.

In another specific implementation, the superstructure grating includes a chirped grating.

In a non-limiting implementation, the gain section further comprises an amplifying section.

In accordance with another broad aspect, the invention provides a method for generating a multi-wavelength laser signal. The method includes providing a gain section including a gain medium having a superstructure grating forming a distributed Fabry-Perot-like structure. The method also includes receiving an energy signal and providing the energy signal to the gain section to generate a multi-wavelength laser signal.

In accordance with another broad aspect, the invention provides a method for manufacturing a multi-wavelength laser source. The method includes providing a gain section and applying a superstructure grating to at least a portion of the gain section. The superstructure grating when applied to the gain section forms a distributed Fabry-Perot-like structure. The method also includes positioning the gain section in communication with a pump laser unit, the pump laser unit being adapted for generating an energy signal. The energy signal is adapted for causing the gain section to generate a multi-wavelength laser signal.

In accordance with another broad aspect, the invention provides a multi-wavelength laser source comprising a pump laser unit, a gain section and an output. The pump laser unit is adapted for generating an energy signal. The gain section includes a gain medium having a superstructure grating forming a distributed Fabry-Perot-like structure. The pump laser unit is adapted for applying the energy signal to the gain section such as to cause a multi-wavelength laser signal to be generated. The multi-wavelength laser signal is emitted at the output.

In accordance with another aspect, the invention provides an optical transmitter apparatus comprising the above described multi-wavelength laser source.

In accordance with another aspect, the invention provides a device suitable for providing optical components characterization comprising the above described multi-wavelength laser source.

In accordance with another aspect, the invention provides a device suitable for providing spectroscopy functionality comprising the above described multi-wavelength laser source.

In accordance with another aspect, the invention provides a device suitable for providing material characterization for non-linear effects comprising the above described multi-wavelength laser source.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 5b is an output spectrum of the laser source configuration shown in FIG. 5a.

FIG. 6a is a block diagram of a laser source configuration in accordance with yet another prior art configuration;

FIG. 6b is an output spectrum of the laser source configuration shown in FIG. 6a.

FIG. 7a is a block diagram of a laser source configuration in accordance with yet another prior art configuration;

FIG. 7b are output spectrums of the laser source configuration shown in FIG. 7a for several dual-frequency laser samples with different frequency spacing;

Other aspects and features of the present invention will become apparent to those ordinarily skilled in the art upon review of the following description of specific embodiments of the invention in conjunction with the accompanying figures.

DETAILED DESCRIPTION

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
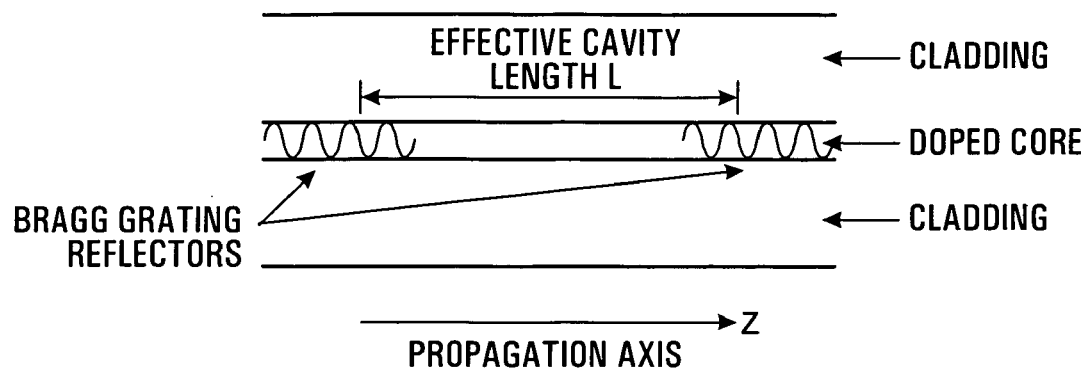
FIG. 1 is a schematic of a laser cavity setup for a DBR (Distributed Bragg Reflector) laser in accordance with a prior art configuration.
Figure 2:
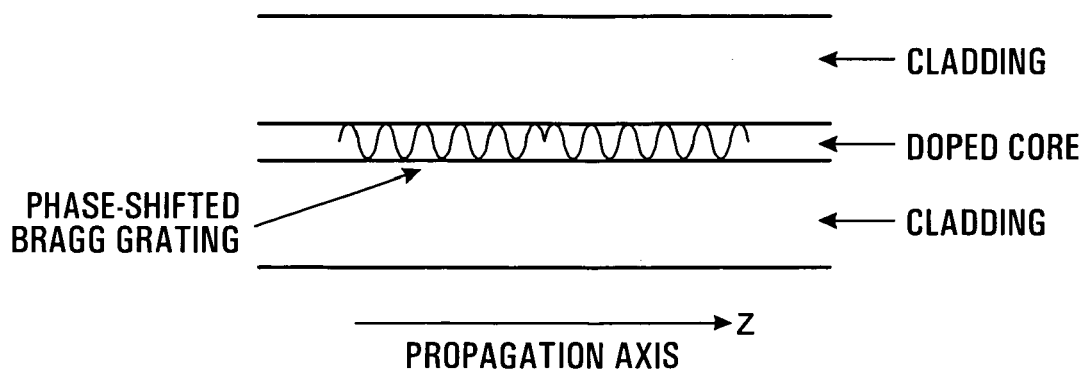
FIG. 2 is a schematic of a laser cavity setup for a DFB (Distributed Feedback) laser in accordance with a prior art configuration.
Figure 3A:
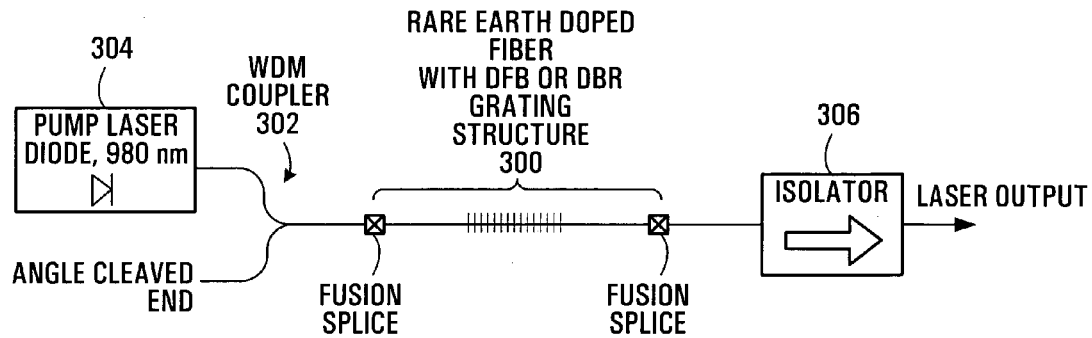
FIG. 3a is a block diagram of a laser source configuration for a single-mode fiber lasers with co-propagation pumping in accordance with a prior art configuration.
Figure 3B:
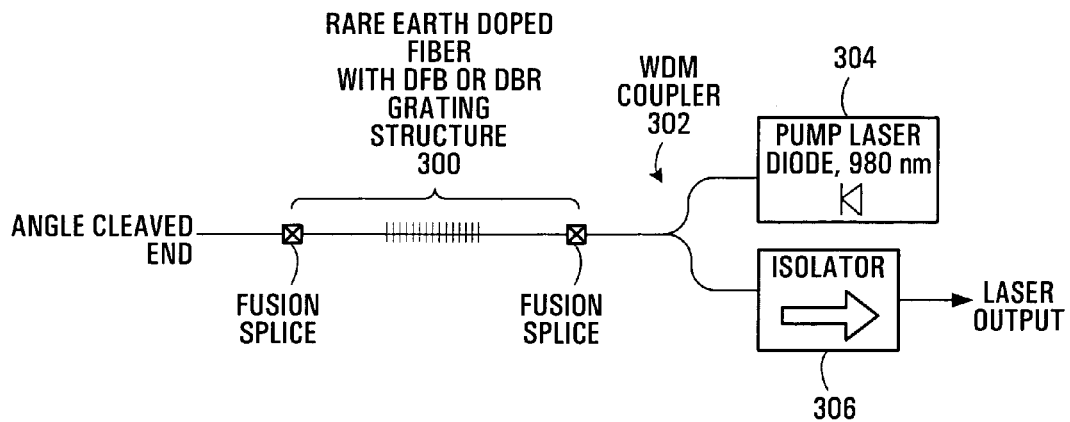
FIG. 3b is a block diagram of a laser source configuration for a single-mode fiber lasers with counter-propagation pumping in accordance with a prior art configuration.
Figure 4A:
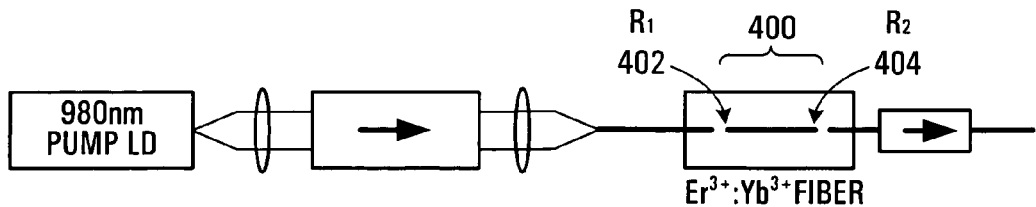
FIG. 4a is a block diagram of a laser source configuration in accordance with another prior art configuration.
Figure 4B:
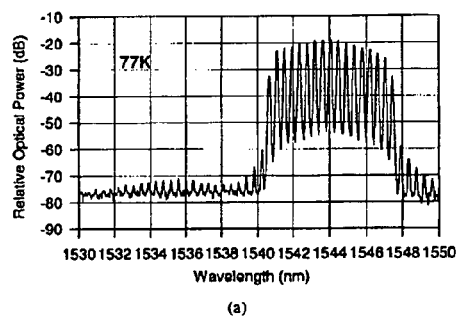
FIGS. 4b, 4c and 4d are output spectrums of the laser source configuration shown in FIG. 4a for various operating temperatures.
Figure 4C:
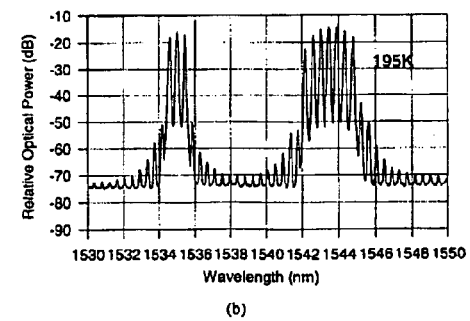
Figure 4D:
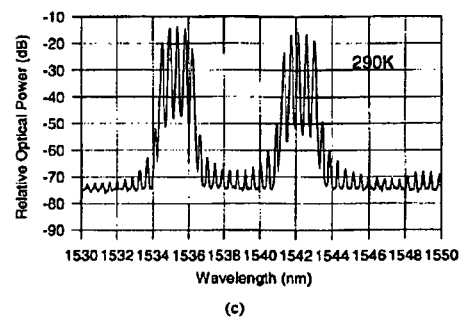
Figure 5A:
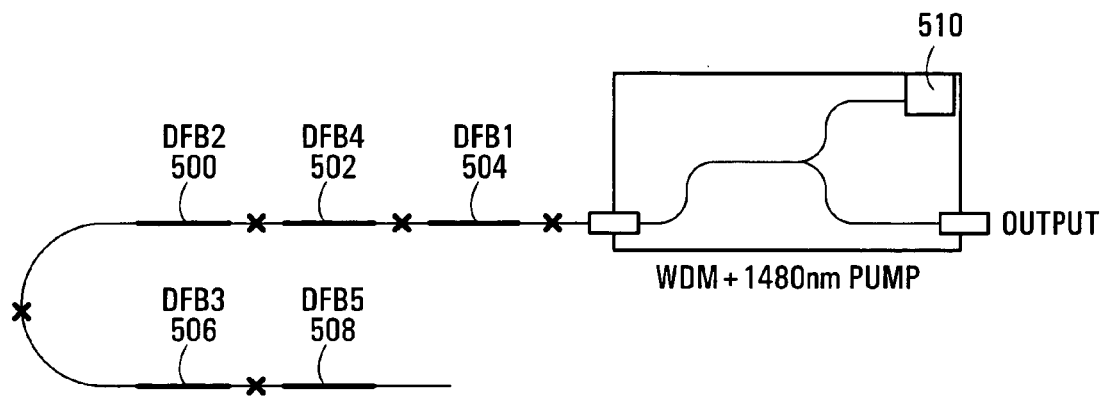
FIG. 5a is a block diagram of a laser source configuration in accordance with yet another prior art configuration.
Figure 5B:
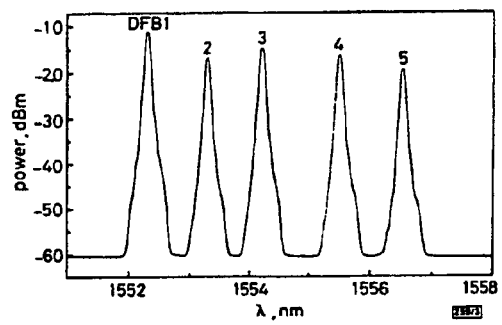
Figure 8A:
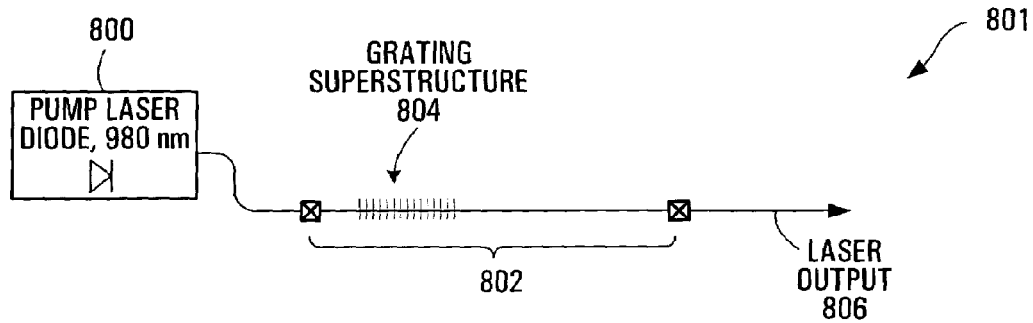
FIG. 8a shows a block diagram of a multi-wavelength laser source in accordance with a specific example of implementation of the present invention.

With reference to FIG. 8a, there is shown a simplified diagram of a multi-wavelength laser source 801 in accordance with a specific example of implementation of the invention. As shown, the multi-wavelength laser source 801 includes a laser source unit 800, a gain section 802 and an output 806. The laser source unit 800 is adapted for generating an energy signal and applying this energy signal to the gain section 802. The gain section 802 includes a gain medium having a superstructure grating 804. The superstructure grating 804 forms a distributed Fabry-Perot-like structure. The superstructure grating causes a multi-wavelength laser signal to be generated when the energy signal is applied to the gain section 802. The multi-wavelength laser signal is then released at the output 806. In specific implementations, the multi-wavelength laser source 801 may be embodied as a miniature fiber laser or waveguide emitting simultaneously on several single-mode frequencies.

In a non-limiting implementation, the laser source unit 800 pump laser diode adapted to emit a signal of 980 nm, 1480 nm or other relevant absorption bands of the gain medium. It will be appreciate that any suitable laser source unit 800 may be used in the multi-wavelength laser source 801 without detracting from the spirit of the invention.

The gain section 802 is connected to the laser source unit 800 by any suitable couplers, such as a WDM coupler for example. The gain medium in the gain section 802 may be comprised of doped glass, semiconductor materials or doped polymer materials. Doped glass includes, for example, erbium-doped glass, rare earth doped glasses or crystals. In a specific implementation, the gain section 802 includes a homogenously broadened gain medium.

The gain section 802 may be part of an optical waveguide. In non-limiting implementations, the optical waveguide may include an optical fiber, a channel waveguide, a planar optical waveguide, a photonic bandgap waveguide or a hollow waveguide. It will be appreciated that other suitable waveguides may be used as part of the gain section 802 without detracting from the spirit of the invention.

In some specific implementations, the optical waveguide includes a waveguide core and a waveguide cladding. In such implementations, the superstructure grating may be located in the waveguide core, in the waveguide cladding or may be located in both the waveguide core and the waveguide cladding.

The superstructure grating on the portion 804 of the gain section 802 may be a continuous grating such as to provide a multi-wavelength laser with a lasing frequency comb with substantially equally spaced frequencies or a discontinuous grating in order to suppress some of the modes. Optionally, some laser wavelengths can be suppressed by using discontinuous gratings to achieve specific laser signature. In a specific implementation, the superstructure grating is an apodized grating. In a non-limiting implementation, the superstructure grating defines a distributed Fabry-Perot-like structure.

The present inventors have made the unexpected discovery that by using a superstructure grating on a gain medium, cross-gain saturation at room temperature between laser wavelengths can be overcome. The superstructure grating creates a distributed Fabry-Perot-like structure where the cavities of the different frequencies are located on spatially separated portions of the gain medium thereby reducing their mutual interaction.

More specifically, the superstructure grating 804 defining a distributed Fabry-Perot-like structure is imprinted in the gain section 802. In a specific implementation, the gain section 802 includes a material with gain. By applying the superstructure grating 804 to the gain section 802, a multi-frequency emission can be obtained over a spectral band defined by the bandwidth of the gratings and with frequency spacing related to the longitudinal shift between the gratings.

In a specific implementation, the superstructure grating has a complex apodization shape of the refractive index modulation in amplitude and phase.

In another specific implementation, the superstructure grating has a chirped period.

In a first specific implementation, the superstructure grating is comprised of a first grating segment and a second grating segment superposed at least in part on the first grating segment. The first grating segment is a chirped Bragg grating and the second grating segment is a chirped Bragg grating. The first and second grating segments may be substantially similar to one another, for example with only a small longitudinal shift, or may differ from one another without detracting from the spirit of the invention. The combination of the first grating segment and a second grating segment forms the superstructure grating. Alternatively, the superstructure grating is comprised of a plurality of grating segments, each grating segment in the plurality of grating segments overlapping at least in part at least another grating segment in the plurality of grating segments. The combination of the plurality of grating segments forms the superstructure grating.

In a second specific implementation, the superstructure grating is comprised of a plurality of sequential grating segments, each grating segment being associated to a respective period and phase.

In a third specific implementation, the superstructure grating is comprised of a single and continuous index grating structure.

For the sake of simplicity, the following description is directed to a superstructure grating forming a distributed Fabry-Perot cavity comprised of two linearly chirped superimposed (Bragg) gratings. It is to be appreciated that the superstructure grating may be constructed using any suitable technique for creating a grating superstructure leading to the formation of a distributed Fabry-Perot-like cavity without detracting from the spirit of the invention.

Linearly chirped Bragg gratings (CBG) are characterized by a grating period that varies along the optical fiber length according to $\Lambda(z)=\Lambda_0+C_h z$ where $C_h$ is the period chirp in nm/cm, z is the position along the grating in cm and $\Lambda_0$ the initial grating period in nm. A chirped grating creates a broadband reflector since the Bragg wavelength also varies along the length of the grating:

$$\lambda_B(z)=2n_{eff}\Lambda_0+2n_{eff}C_h z \quad (3)$$

The reflection bandwidth $\Delta\lambda$ of the grating is thus directly related to the grating chirp and length, $\Delta\lambda \approx 2n_{eff}C_h L_g$ where $L_g$ is the grating length.

In a non-limiting implementation, to create a distributed Fabry-Perot-like (DFP) structure, two chirped gratings are superimposed on the same segment of optical fiber or waveguide with a small longitudinal shift L along the propagation axis z. Typically L is smaller than $L_g$. For further information on how to achieve a distributed Fabry-Perot (DFP) structure by superposing two gratings, the reader is invited to refer to R. Slavik, S. Doucet, and S. LaRochelle, "High-performance All-fiber Fabry-Perot Filters with Superimposed Chirped Bragg Gratings", J. of Lightwave Technol. 21, pp.1059-1065 (2003) and G. E. Town, K. Sugden, J. A. R. Williams, I. Bennion, and S. B. Poole, "Wide-band Fabry-Perot-like filters in optical fiber", IEEE Photon. Technol. Lett. 7, pp. 78-80 (1995). The contents of the above noted documents are incorporated herein by reference.

Figure 8B:
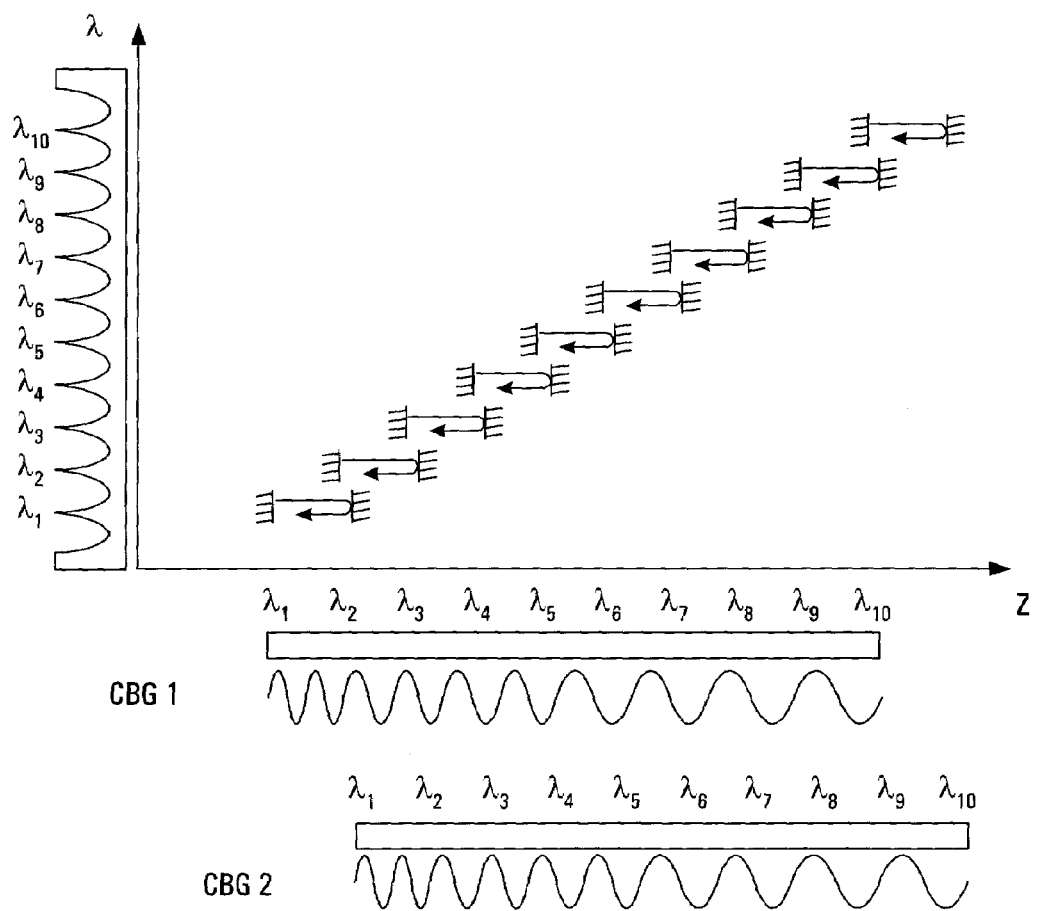
FIG. 8b shows a schematic of a superstructure grating forming a distributed Fabry-Perot-like structure, the superstructure grating being comprising of overlapped chirped Bragg gratings in accordance with a specific non-limiting example of implementation of the present invention.

The grating structure is represented in FIG. 8b where it can be seen that the two surperimposed gratings create a distributed Fabry-Perot structure. As for standard Fabry-Perot structure, the separation of the resonance modes are given by:

$$\Delta f=c/2nL \quad (4)$$

where the cavity length corresponds approximately to the longitudinal shift between the gratings. For more accuracy, especially near the edge of the bandwidth, dispersion of the gratings may be included to determine the longitudinal modes. A difference between the standard Fabry-Perot structure and the distributed Fabry-Perot (DFP) structure is that the respective cavities of the different modes are spatially distributed along the fiber axis. For example, by varying the grating chirp, the overlap between the different cavities can be controlled.

Advantageously, the frequency separation between the lasing lines can be controlled by the superstructure grating parameters. For example, for the two superimposed chirped Bragg gratings implementation, the longitudinal shift between the gratings can be used to control the frequency separation between the lasing lines of the output laser emission according to equation (4), or alternatively the wavelength separation is:

$$\Delta\lambda = \frac{\lambda^2}{2n_g L} \quad (5)$$

where $n_g$ is the group index of the waveguide mode. In the implementation involving the superimposition of two chirped Bragg gratings (CBGs), once the frequency or wavelength separation is fixed, the spatial separation between the resonating fields of the neighbouring cavities is related to the grating chirp because the distance between the centres of the consecutives cavities are inversely proportional to the chirp. The separation of resonating fields of neighbouring cavities can be expressed as follows:

$$2n_g C_h L \leq \Delta\lambda \quad (6)$$

In addition the number of wavelengths emitted by the multi-wavelength laser source 801 can be controlled as a function of the superstructure grating design parameters. For the case of two superimposed CBG implementation, the number of wavelengths, N, is related to the spectral band covered by the gratings, given by product of the gratings chirp and grating length Lg divided by the wavelength separation according to the following mathematical expression:

$$N = \frac{2n_g C_h L_g}{\Delta\lambda} \approx \frac{L_g}{L} \quad (7)$$

The multi-wavelength laser source 801 further comprise additional components such as isolator(s), wavelength selective coupler(s), filters and polarizers amongst others.

The multi-wavelength laser source can be pumped by one or several optical sources using, for example, co-propagation, counter-propagation and polarization multiplexing. In addition, the energy signals can have the same wavelengths or different wavelengths. Alternative configurations of the multi-wavelength laser source 801 are depicted in FIGS. 9a, 9b, 9c, 9d and 9e.

Figure 9A:
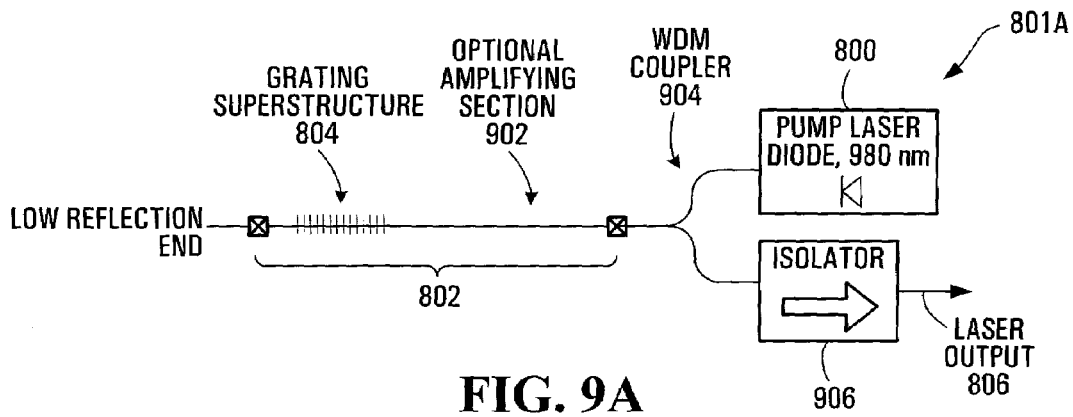
FIGS. 9a, 9b, 9c, 9d and 9e are block diagrams of various configurations of multi-wavelength laser sources in accordance with specific examples of implementation of the present invention.

With reference to FIG. 9a, there is shown a multi-wavelength laser source 801a in accordance with a first specific configuration. As shown, the multi-wavelength laser source 801a includes a laser source unit 800, a gain section 802, an output 806, an isolator 906 and a coupler 904. The isolator 906 is positioned between the gain section 802 and the output 806 and is used to limit the interference between the gain section 802 and devices external to the multi-wavelength laser source 801a such as to increase the stability of the laser source. The coupler 904 connects the laser source unit 800 in a counter-propagation relationship with the laser output 806. In the specific example depicted, the laser source unit 800 is a pump laser emitting a signal having a wavelength of 980 nm. The gain section 802 includes a portion having a superstructure grating structure 804 and, optionally an amplifying section 902 for amplifying the multi-wavelength signal. Although laser source unit 800 is depicted as a single device, the laser source unit may be comprised of one or more modules, such as one or more diodes.

Figure 9B:
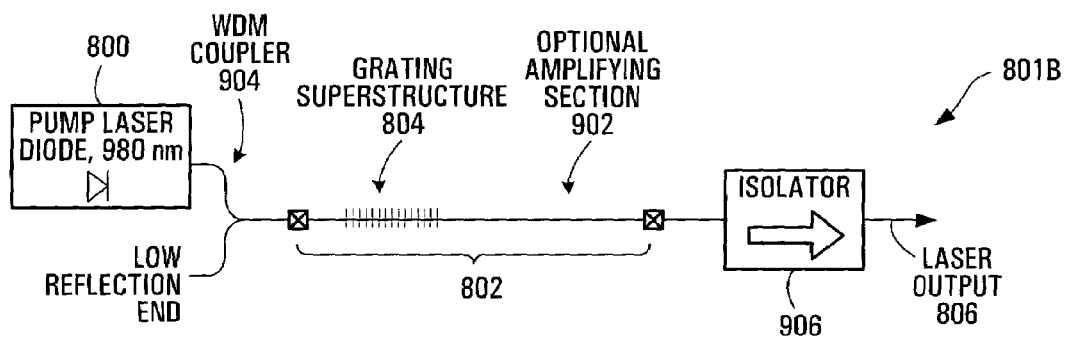

With reference to FIG. 9b, there is shown a multi-wavelength laser source 801b in accordance with a second specific configuration. This second configuration includes components similar to those described in connection with the first specific configuration. In this second configuration, the coupler 904 connects the laser source unit 800 in a co-propagation relationship with the laser output 806.

Figure 9C:
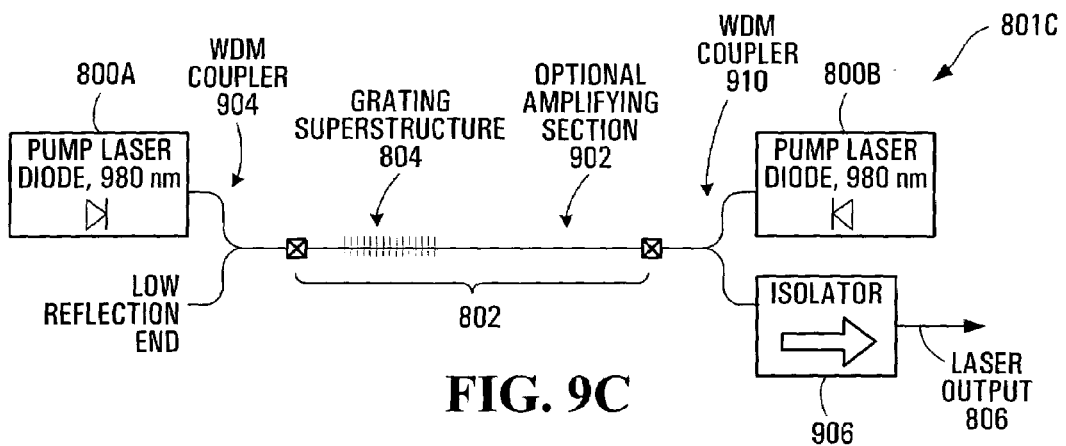

With reference to FIG. 9c, there is shown a multi-wavelength laser source 801c in accordance with a third specific configuration. As shown, the multi-wavelength laser source 801d includes a first laser source unit 800a, a second laser source unit 800b, a gain section 802, an output 806, an isolator 906, a first coupler 904 and a second coupled 910. The isolator 906 is positioned between the gain section 802 and the output 806 and is used to limit the interference between the gain section802 and devices external to the multi-wavelength laser source 801c such as to increase the stability of the multi-wavelength laser signal. The first coupler 904 connects the laser source unit 800a in a co-propagation relationship with the laser output 806. The second coupler 910 connects the laser source unit 800b in a counter-propagation relationship with the laser output 806.

Figure 9D:
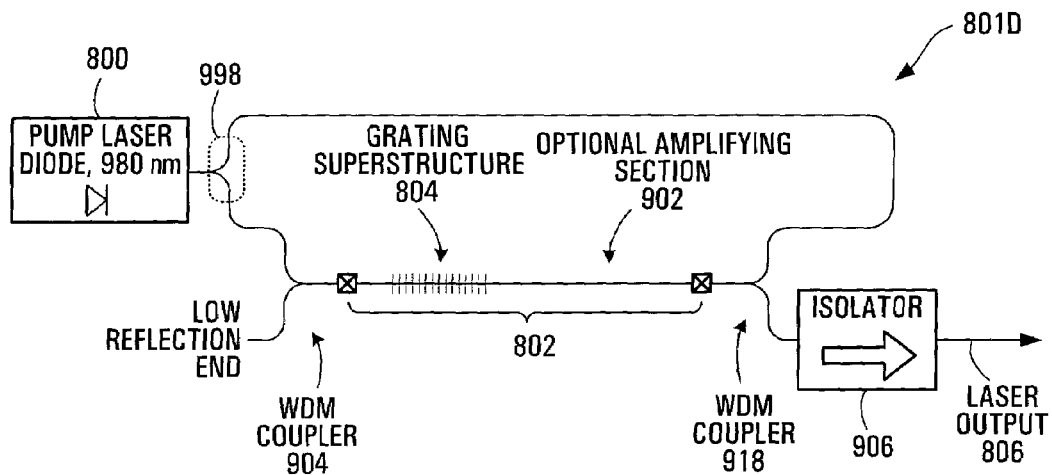

With reference to FIG. 9d, there is shown a multi-wavelength laser source 801d in accordance with a fourth specific configuration. As shown, the multi-wavelength laser source 801d includes a single laser source unit 800 followed by a power divider 998, a gain section 802, an output 806, an isolator 906, a first coupler 904 and a second coupler 918. The first coupler 904 connects a laser source signal transmitted through a first output of the power divider 998 in a co-propagation relationship with the output 806. The second coupler 918 connects a laser source signal transmitted through a second output of the power divider 998 in a counter-propagation relationship with the laser output 806.

Figure 9E:
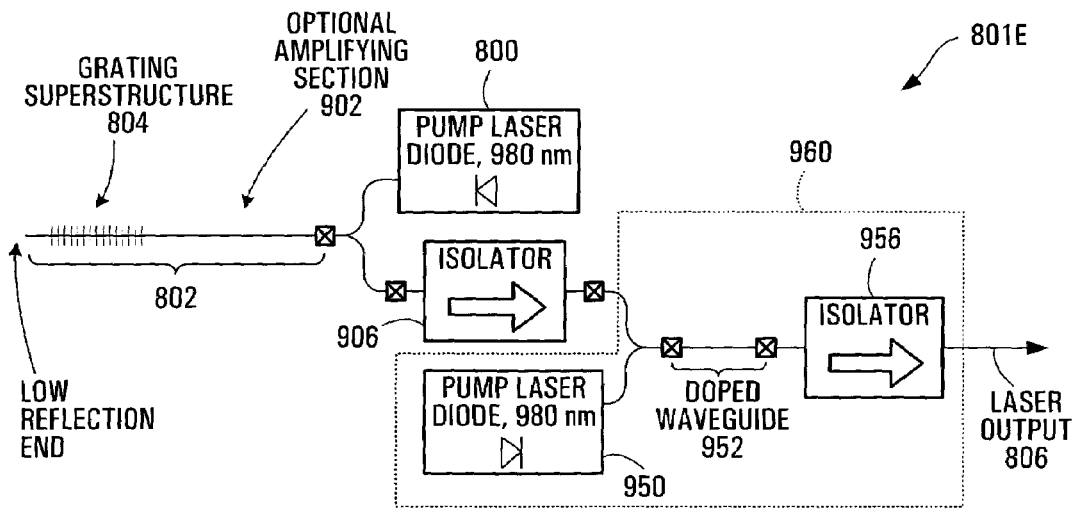

With reference to FIG. 9e, there is shown a multi-wavelength laser source 801e in accordance with a fifth specific configuration. As shown, the multi-wavelength laser source 801e includes the configuration shown in FIG. 9a in combination with an separate laser amplifying section 960 positioned between isolator 906 and output 806. The amplifying section 960 is for increasing the output power of the multi-wavelength laser source 801e. The laser amplifying section 960 includes a laser source unit 950, a gain medium 952 and an isolator 956. The isolator 956 is positioned between the gain medium 952 and the output 806. Optionally, as shown in FIG. 9e, the amplifying section 960 is separated from the gain section 802 by an isolator 906.

It will be appreciated by the person skilled in the art that suitable configurations other that the ones described above are possible and will become apparent in light of the present specification. In addition, although the above described examples depict laser source unit 800 having a common wavelength, namely 980 nm, embodiments of the inventions including multiple laser source units 800 associated to different wavelengths are also possible and are within the scope of the present invention.

The multi-wavelength laser source 801 may be made using suitable known techniques and components. Such methods include providing a gain section comprised of a gain medium and applying a superstructure grating to at least a portion of the gain medium. The method also includes positioning the gain section in communication with a pump laser unit, the pump laser unit being adapted for generating an energy signal. The energy signal is adapted for causing the gain section to generate a multi-wavelength laser signal. The multi-wavelength laser source 801 can be made with discrete components or integrated on the same substrate. Several suitable methods may be used for providing a gain section having a portion with a superstructure grating.

Such methods include for example exposing at least a portion of the gain medium to UV radiation in order to induce the superstructure grating and using lithographic techniques to induce the superstructure grating.

The superstructure grating may be induced in the gain medium in a single step or using multiple grating steps.

In a first specific implementation, the superstructure grating structure is written to the gain medium in a single-step process, for example with the use of complex phase-mask or by the concatenation of small grating segments of well-controlled phase and periods.

In a second specific implementation, the superstructure grating structure is written to the gain medium by partial or complete superposition of two or more Bragg gratings. In a non-limiting implementation, the superstructure grating is applied to a portion of the gain medium by applying a first grating to a first segment of the gain medium and applying a second grating to a second segment of the gain medium. The first segment and the second segment overlap at least in part with one another. In a non-limiting implementation, illustrated in FIG. 10 of the drawings, the first grating and the second grating are induced using UV radiation using a same phase mask to effect the grating. In a non-limiting implementation, the phase mask is designed to induce a chirped Bragg grating in the gain medium when the latter is exposed to UV radiation. The phase mask is displaced by a length L between the first grating and the second grating to create a cavity length L. As such the first grating and the second grating are substantially similar to one another and are displaced by a length L with respect to one another. It will be appreciated that the first and second gratings may also differ from one another without detracting from the spirit of the invention.

Optionally, post-processing of the gratings or waveguide can be done to adjust the spectral characteristics of the multi-wavelength laser source 801, for example the frequency spacing or laser lines amplitudes. Post-processing techniques include for example UV exposure, thermal tuning, the application of strain and stretch, the application of a voltage or the injection of carriers amongst others. Such tuning techniques are well-known in the field of optics and as such will not be described further here. Optionally, dynamic tuning of the laser frequency can be performed using the same techniques as the post-processing techniques in order to adjust spectral characteristics of the multi-wavelength laser source 801.

Advantageously, certain implementation of the multi-wavelength laser source 801 allow generating a multi-frequency emission in a stable and well-controlled fashion in a homogenously broadened gain medium.

Another advantage of certain implementations of the multi-wavelength laser source 801 is that is allows achieving an output laser signal including a plurality of single-mode laser frequency having relatively low noise characteristics.

Another advantage of certain implementations of the multi-wavelength laser source 801 is that it is short, typical length of 1-20 cm, and relatively easy to stabilize.

Practical Implementation

Figure 10:
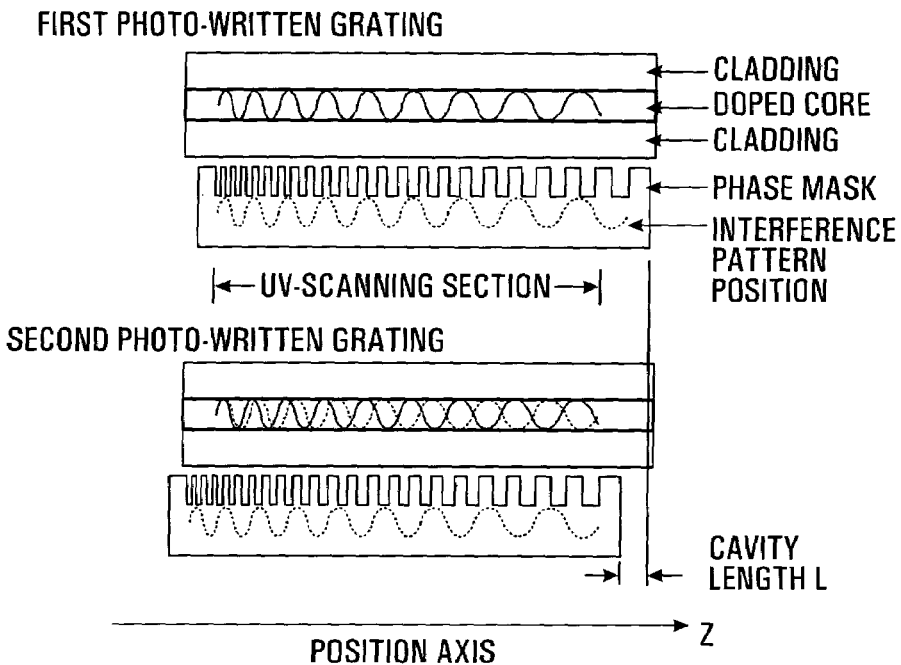
FIG. 10 is a schematic showing a process for writing a superstructure grating on a gain medium using two overlapping gratings in accordance with specific examples of implementation of the present invention.
Figure 11:
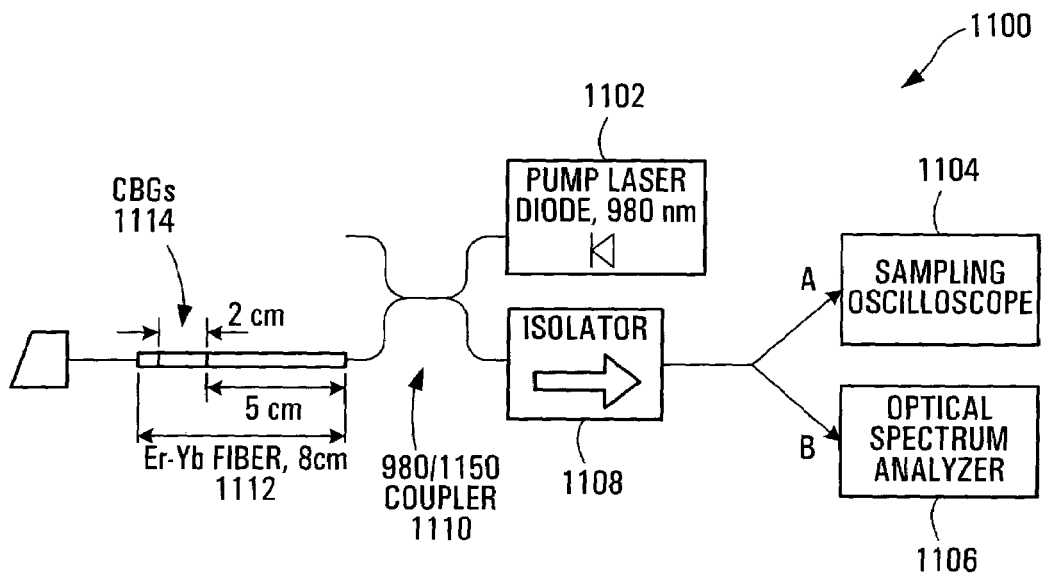
FIG. 11 shows a block diagram of a multi-wavelength laser source in accordance with a specific practical example of implementation of the present invention.

A specific practical implementation of a multi-wavelength laser source 1100 will be described with reference to FIG. 11 of the drawings. In this specific practical implementation, the superstructure gratings implement a distributed Fabry-Perot-like (DFP) structures and were realized in pieces of approximately 8 cm of deuterium loaded $Er^{3+}$—$Yb^{3+}$ fiber 1112 with photosensitive inner cladding spliced between two standard fiber pigtails. During the Bragg grating writing, the fiber was counter-pumped with 155-mW at 980 nm 1102 and the output was monitored with an optical spectrum analyzer (OSA) 1106. Two chirped Bragg gratings (CBGs) were successively written using a 100-mW 244-nm continuous wave (CW) laser and a chirped phase mask (1.25 nm/cm) using the phase-mask scanning method described in J. Martin, and F. Ouellette, "Novel writing technique of long and highly reflective in-fibre gratings", Electron. Lett. 30, pp.911-812 (1994). The contents of the above documents are incorporated herein by reference. The CBGs 1114 starts 5 cm from the pump end of the Er—Yb fiber. First, a strong CBG with 30-dB transmission loss is photo-written in the fiber. Subsequently, a longitudinal shift is induced between the gratings by moving the phase mask with respect to the fiber as indicated in FIG. 10. The second FBG is then written using fast multiple UV beam scans until the desired number of laser lines are obtained. Polarization of the writing UV laser was perpendicular (s-polarization) to the incidence plane defined by the fiber axis and the incident UV beam. Using this polarization, the visibility of the interference fringes is higher, which facilitates inscription of strong superimposed FBGs. Also, s-polarization results in higher photoinduced birefringence and favors single-polarization operation of DFP fiber lasers.

Before characterization the lasers were placed at room temperature for four weeks in order to allow the residual deuterium to diffuse out of the fiber. The laser emission, observed with an OSA 1106 with 10 pm optical resolution, was very stable even without any temperature control. Change in the polarization of the pump laser diode resulted in small output power variations between each lines, typically less than ±0.5 dB.

Several DFP lasers were realized with a longitudinal spacing of 2 mm between the two CBGs giving laser line spacing close to 50 GHz. For the first laser, referred to as DFP#1, the CBGs length was 21 mm and 8 laser lines were obtained. In the second sample, referred to as DFP#2, the CBGs had a length of 42 mm and 15 laser lines were observed.

Figure 12:
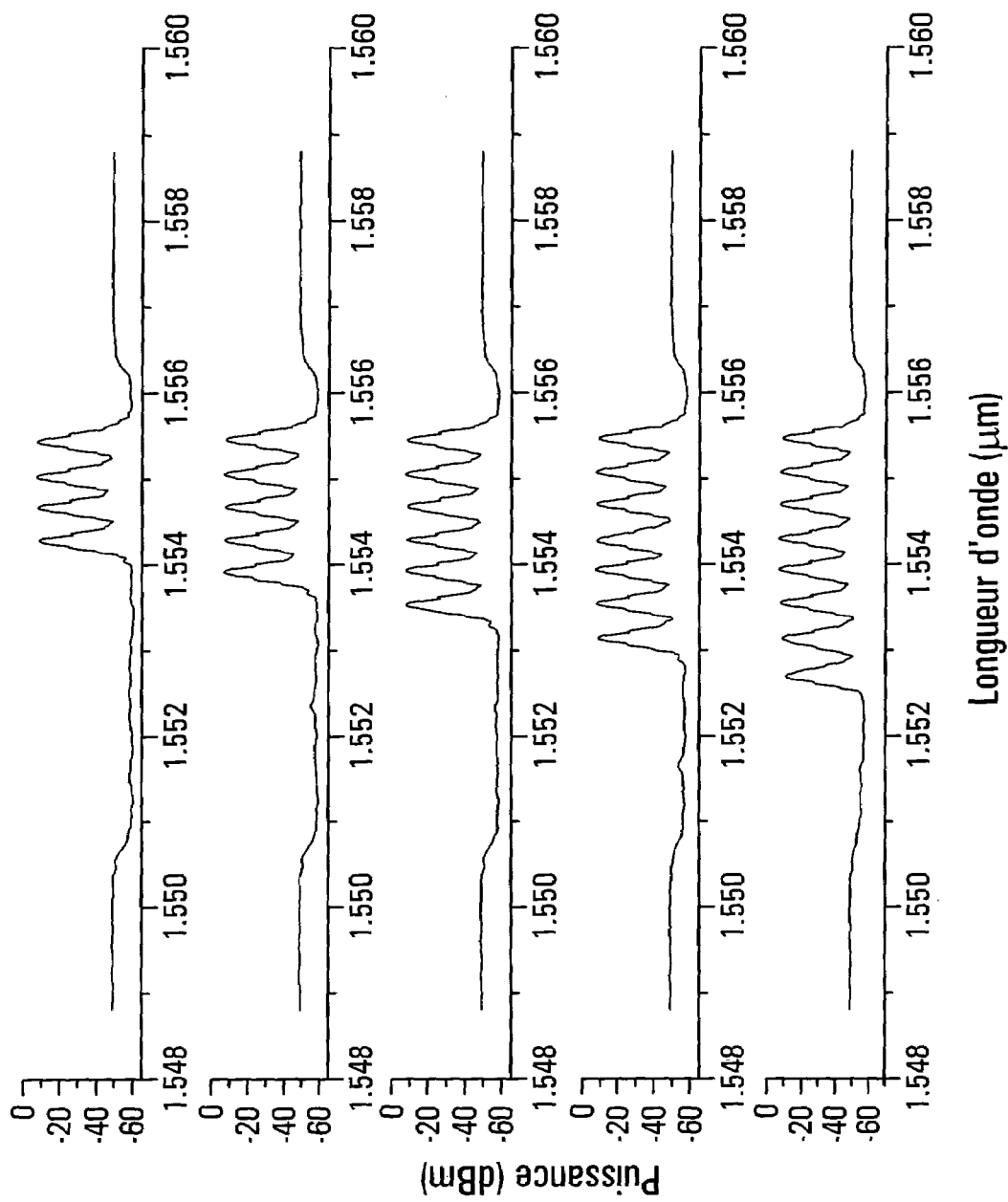
FIG. 12 shows the evolution of the output optical spectrum of the multi-wavelength laser source shown in FIG. 11 in accordance with a first configuration during the writing of the second Bragg grating.
Figure 13:
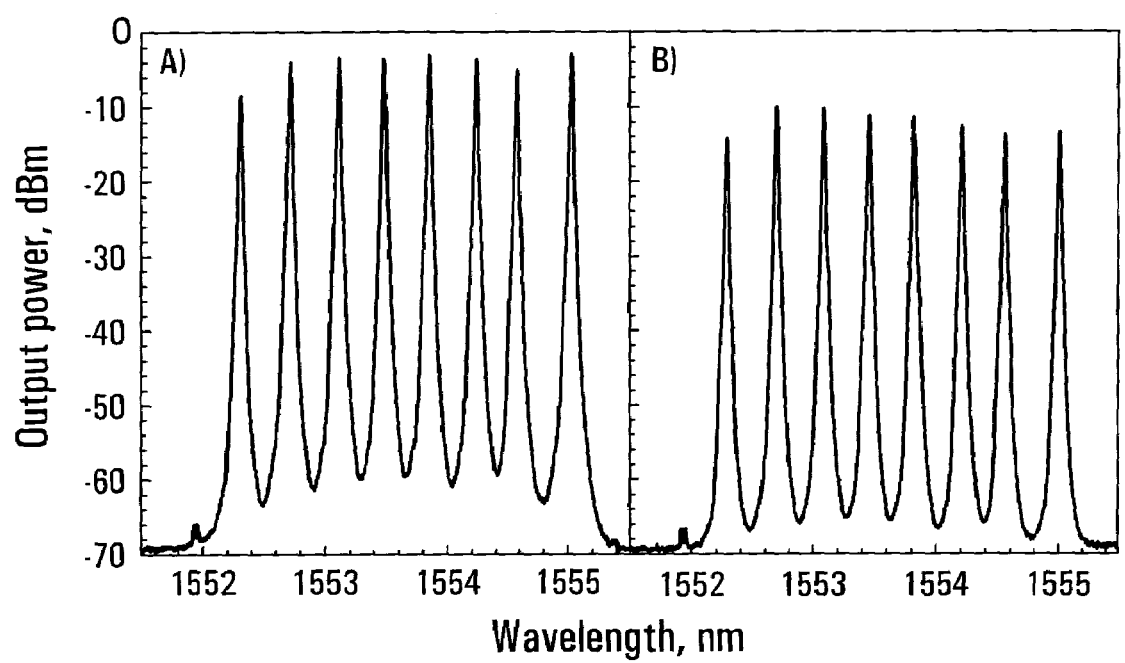
FIG. 13 shows an output optical spectrum for the multi-wavelength laser source shown in FIG. 11 recorded on an OSA with pump power of a) 150 mW and b) 60 mW.

The evolution of the optical spectrum of DFP#1 is shown in FIG. 12 and its final spectrum in FIG. 13. More specifically, FIG. 13A) shows the optical output spectrum recorded on an optical spectrum analyser (OSA) with a pump power of 150 mW and FIG. 13B) shows the optical output spectrum recorded on an optical spectrum analyser (OSA) with a pump power of 60 mW. The laser had a good spectral uniformity with seven among the eight laser lines within 2 dB. The shortest wavelength laser line is weaker due to the fact that the last DFP resonance is at the very end of the structure where the chirped gratings are weaker. In order to get better result, the structure should be slightly (of about 1 mm) longer. The frequency spacing between the modes of the device along one of the polarization axis was 49±3 GHz. From the optical spectrum measurement and from delayed self-heterodyne (40 km) measurements, it was determined that all the laser lines emit in a single polarization (extinction higher than 44 dB). However the laser line at 1554.4 nm is in the orthogonal polarization with respect to the other seven lines that are co-polarized. The linewidth, also evaluated from the delayed self-heterodyne measurement, was typically 100 kHz.

Figure 14:
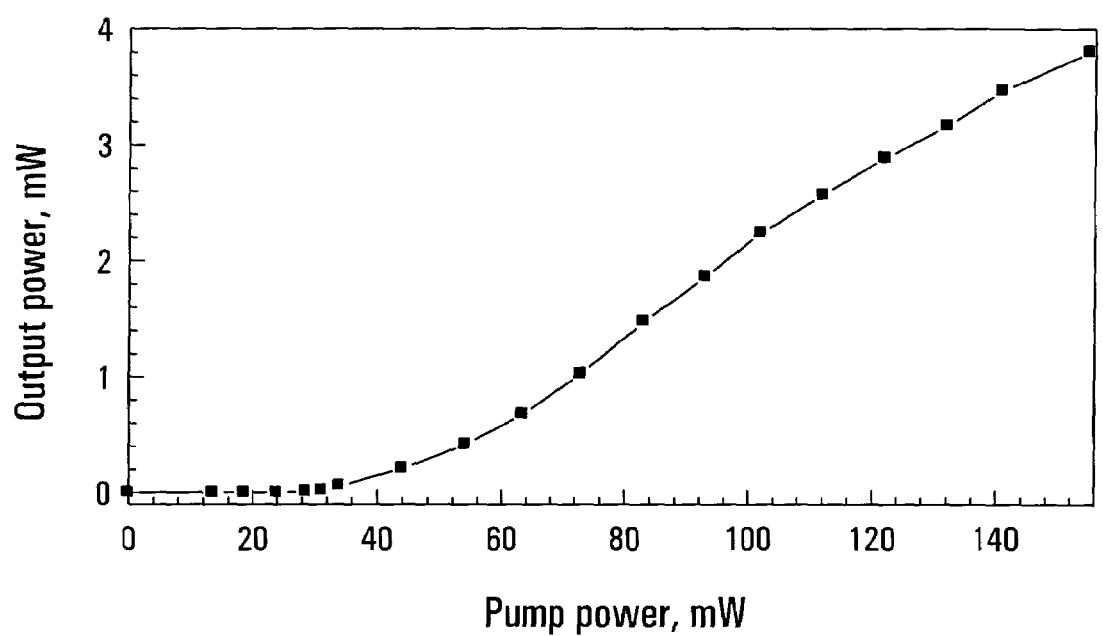
FIG. 14 shows the total output optical spectrum for the multi-wavelength laser source shown in FIG. 11 as a function as the pump power.

The total output power as a function of the pump power is shown in FIG. 14. The laser, pumped in a counter-propagating configuration, had a threshold of 35 mW and the slope efficiency (evaluated for pump powers of 60 to 90 mW) was about 3.8%. The spectral uniformity of the laser output did not change significantly for pump powers between 60-150 mW, as shown in FIG. 13.

Figure 15:
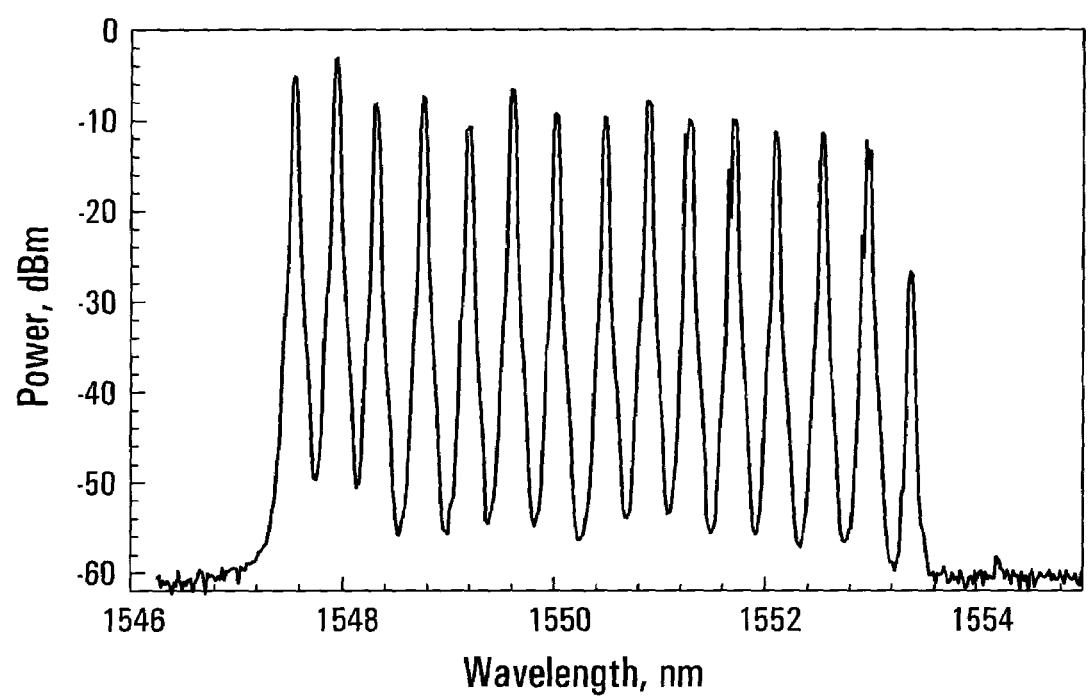
FIG. 15 shows the output optical spectrum of the multi-wavelength laser source shown in FIG. 11 in accordance with a second implementation in which the lasing section is longer (55 mm instead of 20 mm).

The optical spectrum of DFP#2 is shown in FIG. 15 demonstrating the possibility to obtain a large number of lasing frequencies at room temperature in a short segment of erbium doped fiber. It is believed that the laser line intensity decreases as a function of the wavelength due to the insufficient pump power. Dual pumping at both end of the fiber laser should improve this characteristic.

In a specific implementation, the multi-wavelength laser source may be used in a plurality of applications including but not limited to the field of telecommunication and metrology. It can also be used for optical components characterization. Other fields of interest include spectroscopy and sensing.

For example, the multi-wavelength laser source may be integrated in:
- a high speed optical transmission device for use in a communication system;
- an optical communication device for use in a communication system including WDM and CDMA;
- microwave generate equipment;
- a laser source or sensing element for optical sensing systems;

a laser source for optical components characterization;

a laser source for temporal spectroscopy;

a laser source for material characterization using non-linear effect.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A multi-wavelength laser source comprising:
   a) an input for receiving an energy signal;
   b) a gain section in communication with said input, said gain section including a homogeneously broadened gain medium comprising rare-earth doped fiber having a superstructure grating, said superstructure grating comprising a first grating segment and a second grating segment superposed at least in part on said first grating segment to form at least three cavities, each of said cavities occupying a portion of said doped fiber that is unoccupied by any other one of said cavities such that, when the energy signal is applied to said gain section:
      different laser wavelengths resonate in respective ones of said cavities; and
      said gain section generates a multi-wavelength laser signal exhibiting the laser wavelengths; and
   c) an output for emitting the multi-wavelength laser signal.

2. A multi-wavelength laser source as defined in claim 1, wherein the energy signal is generated by either one of a pump laser diode, a fiber laser pump, a solid state laser pump and a raman laser pumps.

3. A multi-wavelength laser source as defined in claim 1, wherein the gain section further comprises an amplifying section.

4. A multi-wavelength laser source as defined in claim 1, wherein the first grating segment is a chirped Bragg grating.

5. A multi-wavelength laser source as defined in claim 4, wherein the second Grating segment is a chirped Bragg grating.

6. A multi-wavelength laser source as defined in claim 1, wherein the first grating segment and the second grating segment are substantially similar to one another.

7. A multi-wavelength laser source as defined in claim 6, wherein the superstructure grating includes an index grating structure.

8. A multi-wavelength laser source as defined in claim 1, wherein the superstructure grating has a complex apodization shape in amplitude.

9. A multi-wavelength laser source as defined in claim 8, wherein the superstructure grating has a complex apodization shape in phase.

10. A multi-wavelength laser source as defined in claim 1, wherein the doped fiber comprises a core and a cladding and the superstructure grating is located in the core.

11. A multi-wavelength laser source as defined in claim 1, wherein the doped fiber comprises a core and a cladding and the superstructure grating is located in the cladding.

12. A method for generating a multi-wavelength laser signal, said method comprising:
   a) receiving an energy signal;
   b) providing a gain section including a homogeneously broadened gain medium comprising rare-earth doped fiber having a superstructure grating, said superstructure grating comprising a first grating segment and a second grating segment superposed at least in part on said first grating segment to form at least three cavities, each of said cavities occupying a portion of said doped fiber that is unoccupied by any other one of said cavities such that, when the energy signal is applied to said gain section, different laser wavelengths resonate in respective ones of said cavities; and
   c) applying the energy signal to said gain section to generate a multi-wavelength laser signal exhibiting the laser wavelengths.

13. An optical transmitter apparatus comprising the multi-wavelength laser source described in claim 1.

14. A device suitable for providing optical components characterization comprising the multi-wavelength laser source described in claim 1.

15. A device suitable for providing temporal spectroscopy functionality comprising the multi-wavelength laser source described in claim 1.

16. A device suitable for providing material characterization for non-linear effects comprising the multi-wavelength laser source described in claim 1.

17. A multi-wavelength laser source comprising:
   a) a pump laser unit adapted for generating an energy signal;
   b) a gain section including a homogeneously broadened gain medium comprising rare-earth doped fiber having a superstructure grating, said superstructure grating comprising a first grating segment and a second grating segment superposed at least in part on said first grating segment to form at least three cavities, each of said cavities occupying a portion of said doped fiber that is unoccupied by any other one of said cavities such that, when the energy signal is applied to said gain section:
      different laser wavelengths resonate in respective ones of said cavities; and
      said gain section generates a multi-wavelength laser signal exhibiting the laser wavelengths; and
   c) an output for emitting the multi-wavelength laser signal.

18. A multi-wavelength laser source as defined in claim 17, wherein the pump laser unit is positioned such as to generate the energy signal in a co-propagation relationship with the output.

19. A multi-wavelength laser source as defined in claim 17, wherein the pump laser unit is positioned such as to generate the energy signal in a counter-propagation relationship with the output.

20. A multi-wavelength laser source as defined in claim 17, wherein said gain section comprises an amplification section.

21. A multi-wavelength laser source as defined in claim 1, wherein the multi-wavelength laser signal exhibits at least 8 laser wavelengths.

22. A multi-wavelength laser source as defined in claim 21, wherein the multi-wavelength laser signal exhibits at least 15 laser wavelengths.

23. A method as defined in claim 12, wherein the multi-wavelength Laser signal exhibits at least 8 laser wavelengths.

24. A method as defined in claim 23, wherein the multi-wavelength laser signal exhibits at least 15 laser wavelengths.

25. A multi-wavelength laser source as defined in claim 17, wherein the multi-wavelength laser signal exhibits at least 8 laser wavelengths.

26. A multi-wavelength laser source as defined in claim 25, wherein the multi-wavelength laser signal exhibits at least 15 laser wavelengths.

27. A multi-wavelength laser source as defined in claim 1, wherein said homogeneously broadened gain medium has a length, the multi-wavelength laser signal is characterized by a number of laser wavelengths, and a ration of the number of laser wavelengths to the length of said gain medium is at least 1.0 laser wavelength per cm of length of said gain medium.

28. A method as defined in claim 12, wherein the homogeneously broadened gain medium has a length, the multi-wavelength laser signal is characterized by a number of laser wavelengths, and a ratio of the number of laser wavelengths to the length of the gain medium is at least 1.0 laser wavelength per cm of length of the gain medium.

29. A multi-wavelength laser source as defined in claim 17, wherein said homogeneously broadened gain medium has a length, the multi-wavelength laser signal is characterized by a number of laser wavelengths, and a ratio of the number of laser wavelengths to the length of said gain medium is at least 1.0 laser wavelength per cm of the length of said gain medium.

30. A multi-wavelength laser source defined in claim 1, said at least three cavities comprising at least eight cavities.

31. A multi-wavelength laser source as defined in claim 1, wherein each of said cavities occupies a portion of said doped fiber that is also occupied by another one of said cavities.

32. A multi-wavelength laser source as defined in claim 1, wherein the first grating segment and the second grating segment define respective refractive index modulations that are shifted relative to one another along the doped fiber by a longitudinal shift, each of the first grating segment and the second grating segment being longer than the longitudinal shift.

33. A multi-wavelength laser source as defined in claim 32, wherein each of the first grating segment and the second grating segment is at least 10 times longer than the longitudinal shift.

34. A multi-wavelength laser source as defined in claim 33, wherein each of the first grating segment and the second grating segment is at least 20 times longer than the longitudinal shift.

35. A multi-wavelength laser source as defined in claim 1, wherein the first grating segment has a length and a ratio of the number of laser wavelengths exhibited by the multi-wavelength laser signal to the length of the first grating is at least 3.6 laser wavelengths per cm.

36. A multi-wavelength laser source as defined in claim 1, wherein the multi-wavelength laser source has a length less than 20 cm.

37. A method as defined in claim 12, said at least three cavities comprising at least eight cavities.

38. A method as defined in claim 12, wherein each of said cavities occupies a portion of said doped fiber that is also occupied by another one of said cavities.

39. A method as defined in claim 12, wherein the first grating segment and the second grating segment define respective refractive index modulations that are shifted relative to one another along the doped fiber by a longitudinal shift, each of the first grating segment and the second grating segment being longer than the longitudinal shift.

40. A method as defined in claim 39, wherein each of the first grating segment and the second grating segment is at least 10 times longer than the longitudinal shift.

41. A method as defined in claim 40, wherein each of the first grating segment and the second grating segment is at least 20 times longer than the longitudinal shift.

42. A method as defined in claim 12, wherein the first grating segment has a length and a ratio of the number of laser wavelengths exhibited by the multi-wavelength laser signal to the length of the first grating is at least 3.6 laser wavelengths per cm.

43. A method as defined in claim 12, wherein the multi-wavelength laser source has a length less than 20 cm.

44. A multi-wavelength laser source comprising:
a) an input for receiving an energy signal;
b) a gain section in communication with said input, said gain section including a homogeneously broadened gain medium comprising rare-earth doped fiber having a superstructure grating, said superstructure grating forming at least three cavities, each of said cavities occupying a portion of said doped fiber that is unoccupied by any other one of said cavities such that, when the energy signal is applied to said gain section:
different laser wavelengths resonate in respective ones of said cavities; and
said gain section generates a multi-wavelength laser signal exhibiting the laser wavelengths; and
c) an output for emitting the multi-wavelength laser signal.

45. A multi-wavelength laser source as defined in claim 44, said at least three cavities comprising at least eight cavities.

46. A multi-wavelength laser source as defined in claim 44, wherein each of said cavities occupies a portion of said doped fiber that is also occupied by another one of said cavities.

47. A multi-wavelength laser source as defined in claim 44, wherein said superstructure grating comprises at least two grating segments at least partially superposed on one another to form said cavities.

48. A multi-wavelength laser source as defined in claim 47, wherein each of said grating segments is a chirped grating segment.

49. A multi-wavelength laser source as defined in claim 47, wherein the grating segments define respective refractive index modulations that are shifted relative to one another along the doped fiber by a longitudinal shift, each of the grating segments being longer than the longitudinal shift.

50. A multi-wavelength laser source as defined in claim 49, wherein each of the first grating segment and the second grating segment is at least 10 times longer than the longitudinal shift.

51. A multi-wavelength laser source as defined in claim 50, wherein each of the first grating segment and the second grating segment is at least 20 times longer than the longitudinal shift.

52. A multi-wavelength laser source as defined in claim 47, wherein a given one of the grating segments has a length and a ratio of the number of laser wavelengths exhibited by the multi-wavelength laser signal to the length of the given one of the grating segments is at least 3.6 laser wavelengths per cm.

53. A multi-wavelength laser source as defined in claim 44, wherein the multi-wavelength laser source has a length less than 20 cm.

54. A multi-wavelength laser source as defined in claim 44, wherein the multi-wavelength laser signal exhibits at least 8 laser wavelengths.

55. A multi-wavelength laser source as defined in claim 54, wherein the multi-wavelength laser signal exhibits at least 15 laser wavelengths.

* * * * *